United States Patent Office 2,916,697
Patented Dec. 8, 1959

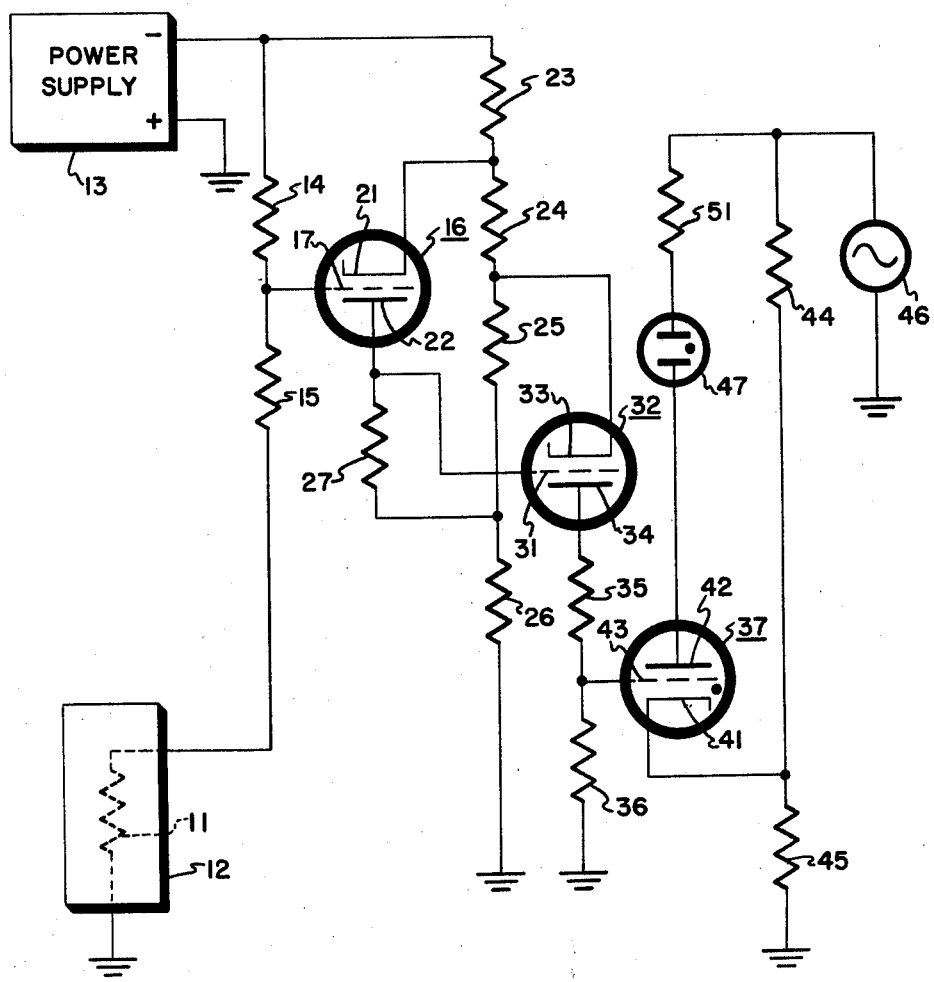

2,916,697

INSULATION RESISTANCE MEASURING CIRCUIT

Carl N. Boode, Riverside, Calif., assignor to Bourns, Inc.

Application July 5, 1955, Serial No. 519,995

2 Claims. (Cl. 324—54)

This invention relates to measurement of insulation resistance, and more particularly, to a device of this class which is safe and convenient to use and is capable of great accuracy.

It is frequently necessary to determine the quality of the insulation of electrical equipment. Devices such as motors and transformers, having many turns of insulated wire, may be rendered unserviceable by a slight leakage of current through faulty insulation from the wiring to the frame. The leakage current may be very small at first, but, since the leakage current tends to heat the insulation, eventually the insulation breaks down completely, causing a destructive short circuit. Therefore, manufacturers of electrical equipment, such as transformers and motors, carefully measure the insulation resistance of these products to insure that leakage currents are negligible. High accuracy is essential for insulation testing. If a defective piece of equipment is delivered, it will have to be replaced, and on the other hand, the manufacturer does not wish to tear down and rewire equipment unnecessarily. Thus, if a particular tolerable amount of leakage resistance is specified an accurate measurement of insulation resistance enables the manufacturer to detect and rewire only that equipment which falls below the specification limit of insulation resistance, and hence, have a high amount of leakage.

It will be apparent, therefore, that it is necessary to measure insulation resistance accurately and quickly. Moreover, the insulation resistance measuring device disclosed hereinbelow requires only one bulky and expensive high voltage power supply to test a plurality of electrical devices simultaneously.

Insulation resistance may be determined by applying a known high voltage between the wiring of a motor and the motor frame, or between the wiring of a transformer and the iron core, and measuring the leakage current. In this invention, a high voltage power supply is applied across the insulation to be tested in series with a precision resistor. The leakage current through the insulation causes a voltage drop across the resistor. An electronic direct current amplifier amplifies the voltage drop by a known amount, and actuates a suitable indicating device.

It is, therefore, an object of this invention to provide an improved insulation resistance measuring device.

Another object of this invention is to provide an improved insulation resistance measuring device which does not expose the operator to dangerous high potentials.

Another object of this invention is to provide an insulation resistance measuring device wherein exposed portions of the device tested, and the indicator, are at ground potential.

Another object of this invention is to provide an insulation resistance measuring device employing electronic means for greatly improved accuracy.

Another object of this invention is to provide an insulation resistance measuring device wherein one high voltage power supply may be employed to determine the insulation resistance of a plurality of devices simultaneously.

Another object of this invention is to provide an insulation resistance measuring device which is highly accurate, safe to use, and inexpensive to manufacture.

Further features and objects of this invention will be apparent upon study of this specification taken in conjunction with the accompanying drawing, wherein is illustrated a schematic diagram of an insulation resistance measuring device constructed in accordance with this invention.

The insulation resistance measuring device disclosed herein may be employed to measure the insulation resistance 11 of an item of electrical equipment 12, such as a motor or transformer. The case, frame or core of the equipment is connected to ground. A high voltage direct current power supply 13 furnishes a high negative voltage, exemplarily, 600 volts, to the object 12 to be tested through grid resistor 14 and current limiting resistor 15. The positive terminal of power supply 13 is grounded.

A first electron discharge device 16 includes a control electrode 17, connected to the junction between resistors 14 and 15, a cathode 21, and an anode 22. Four resistors, 23, 24, 25, and 26, serially connected between the negative terminal of power supply 13 and ground, provide the correct operating potentials to electron discharge device 16. Cathode 21 is connected between resistors 25 and 26 through load resistor 27.

Anode 22 of electron discharge device 16 is also connected to the control electrode 31 of a second electron discharge device 32. In addition to control electrode 31, electron discharge device 32 also includes a cathode 33 and an anode 34. Cathode 33 is connected between resistors 24 and 25, while anode 34 is connected to ground through resistors 35 and 36.

Means for indicating the presence or absence of leakage current through insulation resistance 11 may include a gas filled electron discharge device 37, including at least a cathode 41, an anode 42, and a control electrode 43. Control electrode 43 is connected between resistors 35 and 36. Cathode 41 is connected to the junction between resistors 44 and 45, comprising a voltage divider. Resistor 45 is connected to ground, and resistor 44 is connected to one terminal of a suitable source of alternating voltage 46. Anode 42 of electron discharge device 37 is also connected to alternating voltage source 46 through an indicating lamp 47 and a load resistor 51.

The high negative direct voltage furnished by power supply 13 is applied to the windings of the device to be tested. The frame of the device is connected to ground. Thus, if no leakage current flows, there is no voltage drop through grid resistor 14, and control electrode 17 is maintained at a potential of minus 600 volts. The cathode 21 is at a less negative potential, due to the voltage drop through resistor 23 of the voltage divider. Anode 22 is at a still less negative potential. However, since control electrode 17 is more negative than cathode 21, space current does not flow in discharge device 16.

Since space current does not flow in discharge device 16 under this condition, the potential of anode 22 is at a low negative potential. Therefore, the potential of control electrode 31 of discharge device 32 is less negative than cathode 33, and maximum space current flows through discharge device 32. Space current flowing through resistors 35 and 36 causes a maximum negative potential to appear on control electrode 43 of gas tube 37. With a high negative potential applied to control electrode 43, gas discharge device 37 cannot conduct, and indicating lamp 47 will not glow.

Conversely, a high leakage current flowing through insulation resistance 11 causes a less negative potential to apepar at control electrode 17, and discharge device 16 will conduct. Due to the voltage drop through load resistor 27, a more negative potential is applied to control electrode 31 of discharge device 32, decreasing space current therethrough. The resultant reduced voltage drop through resistor 36 applies a less negative potential to control electrode 43 of gas discharge device 37, causing it to conduct during positive half cycles of alternating current source 46, and causing lamp 47 to glow, thereby signifying to the operator the presence of excessive leakage current.

By suitably proportioning grid resistor 14 and voltage divider resistors 23, 24, 25, and 26, lamp 47 may be caused to glow at any desired value of leakage current through insulation resistance 11. Although lamp 47 is illustrated herein as an indicating device, it will be apparent that a relay may be inserted in place of, or in addition to lamp 47, for control purposes. A numerical indication of insulation resistance may be obtained by inserting a suitably calibrated ammeter between anode 34 and resistor 35, or a voltmeter may be placed across resistor 36. Similarly, although two stages of direct current amplification are disclosed hereinabove, one stage may be ample in some applications. Alternatively, three or more stages may be required at other times.

Since high voltage power supply 13 is bulky and expensive, means may be provided whereby only one power supply need be employed to test a plurality of objects simultaneously. A plurality of objects similar to 12 may be connected in parallel fashion to the negative terminal of power supply 13, each in series with a pair of resistors similar to resistors 14 and 15. A suitable switching circuit, of a type well known in the art, may be employed to successively connect control electrode 17 of electron discharge device 16 to the interconnection point of each pair of series resistors.

It will be apparent, therefore, that hereinabove has been disclosed a safe, accurate device for measuring insulation resistance. The voltage drop across a resistor caused by leakage current through the insulation to ground is amplified by two stages of direct current amplification, and caused to actuate suitable indicating means.

While there has been described what is at present considered to be the preferred embodiment of this invention, it will be understood that various modifications may be made therein, and it is intended to cover in the appended claims all such modifications as fall within the true spirit and scope of this invention.

What is claimed is:

1. A current flow amplifier for use in an insulation resistance measuring circuit having a high voltage D.C. power supply connected on the positive side to ground, a gas filled electron discharge device and power supply therefor, and an indicating means operatively connected to the output of said electron discharge device, said amplifier comprising, in combination, a grid resistor and a current limiting resistor connected in series between the negative side of said D.C. power supply and the windings of the test device, the body of said test device being connected to ground, a vacuum tube having a cathode, grid and plate, said grid being connected between said resistors, voltage divider means connected in series between said negative side of said D.C. power supply and the ground, the cathode of said vacuum tube being connected to said voltage divider means at the point providing the cathode with the correct negative bias voltage, the plate output of said vacuum tube being applied to said electron discharge device so as to actuate the latter responsive to the flow of current through said grid resistor.

2. A current flow amplifier for use in an insulation resistance measuring circuit having a high voltage D.C. power supply connected on the positive side to ground, a gas filled electron discharge device and power supply therefor, and an indicating means operatively connected to the output of said electron discharge device, said amplifier comprising, in combination, a grid resistor and a current limiting resistor connected in series between the negative side of said D.C. power supply and the article being tested, a pair of vacuum tubes each having a cathode, grid and plate, two pairs of voltage divider resistors connected in series between said negative side of said D.C. power supply and the ground, the grid of the first vacuum tube being connected between said grid resistor and said current limiting resistor, the cathode of said first vacuum tube being connected between the first pair of said voltage divider resistors, the plate of said first vacuum tube being connected to the grid of the second vacuum tube, a load resistor connected between said second pair of voltage divider resistors and to the plate of said first vacuum tube, the cathode of said second vacuum tube being connected between the first and second pairs of voltage divider resistors, and the plate of said second vacuum tube being operatively connected to said electron discharge device so as to actuate the latter responsive to the flow of current through said grid resistor.

References Cited in the file of this patent

UNITED STATES PATENTS

| | | |
|---|---|---|
| 1,824,802 | Brehman | Sept. 29, 1931 |
| 2,240,929 | Hays | May 6, 1941 |
| 2,459,239 | Payne | Jan. 18, 1949 |
| 2,699,528 | Periale | Jan. 11, 1955 |
| 2,701,336 | Anderson | Feb. 1, 1955 |
| 2,749,511 | Canning | June 5, 1956 |